(12) United States Patent
Tanizawa

(10) Patent No.: US 9,019,959 B2
(45) Date of Patent: Apr. 28, 2015

(54) NODE, SWITCH, AND SYSTEM

(75) Inventor: Yoshimichi Tanizawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 13/232,342

(22) Filed: Sep. 14, 2011

(65) Prior Publication Data

US 2012/0076139 A1    Mar. 29, 2012

(30) Foreign Application Priority Data

Sep. 28, 2010   (JP) .................................. 2010-217268

(51) Int. Cl.
*H04L 12/28* (2006.01)
*H04L 29/06* (2006.01)
*H04L 12/26* (2006.01)
*H04L 5/12* (2006.01)
*G06F 15/16* (2006.01)

(52) U.S. Cl.
CPC ....................................... *H04L 69/24* (2013.01)

(58) Field of Classification Search
USPC .......... 370/230, 296, 389; 709/228, 233, 296; 726/13; 713/320
See application file for complete search history.

(56) References Cited

U.S. PATENT DOCUMENTS

| | | | | |
|---|---|---|---|---|
| 5,884,041 | A * | 3/1999 | Hurwitz | 709/228 |
| 6,529,957 | B1 * | 3/2003 | Joergensen | 709/233 |
| 2002/0039354 | A1 * | 4/2002 | Chen et al. | 370/296 |
| 2002/0157030 | A1 * | 10/2002 | Barker et al. | 713/320 |
| 2004/0257989 | A1 * | 12/2004 | Lingafelt et al. | 370/230 |
| 2010/0031340 | A1 * | 2/2010 | Batke et al. | 726/13 |

FOREIGN PATENT DOCUMENTS

JP    2006-253867    9/2006

OTHER PUBLICATIONS

Office Action dated Aug. 21, 2012 in JP Application No. 2010-217268 with English-language translation.
Genba Ito, "Switch & Router"; Network Magazine; vol. 13 No. 4; Apr. 1, 2008; pp. 120-127.

* cited by examiner

*Primary Examiner* — Helal A Algahaim
*Assistant Examiner* — Mahmoud Ismail
(74) *Attorney, Agent, or Firm* — Nixon & Vanderhye, P.C.

(57) ABSTRACT

According to one embodiment, a node is capable of conforming to one of a plurality of Ethernet standards and includes: an Ethernet controller unit that performs auto-negotiation with a switch to exchange information concerning an interface speed, to determine an interface speed to be used based on the information concerning the interface speed, and to receive information including a setting Ethernet standard set as an Ethernet standard to be used; a storage unit that stores a node's available Ethernet standard which is an Ethernet standard to which the node can conform; and a controller that performs setting such that the node operates using a coincident standard between the Ethernet standard stored in the storage unit and setting Ethernet standard and connects a link to the switch.

11 Claims, 12 Drawing Sheets

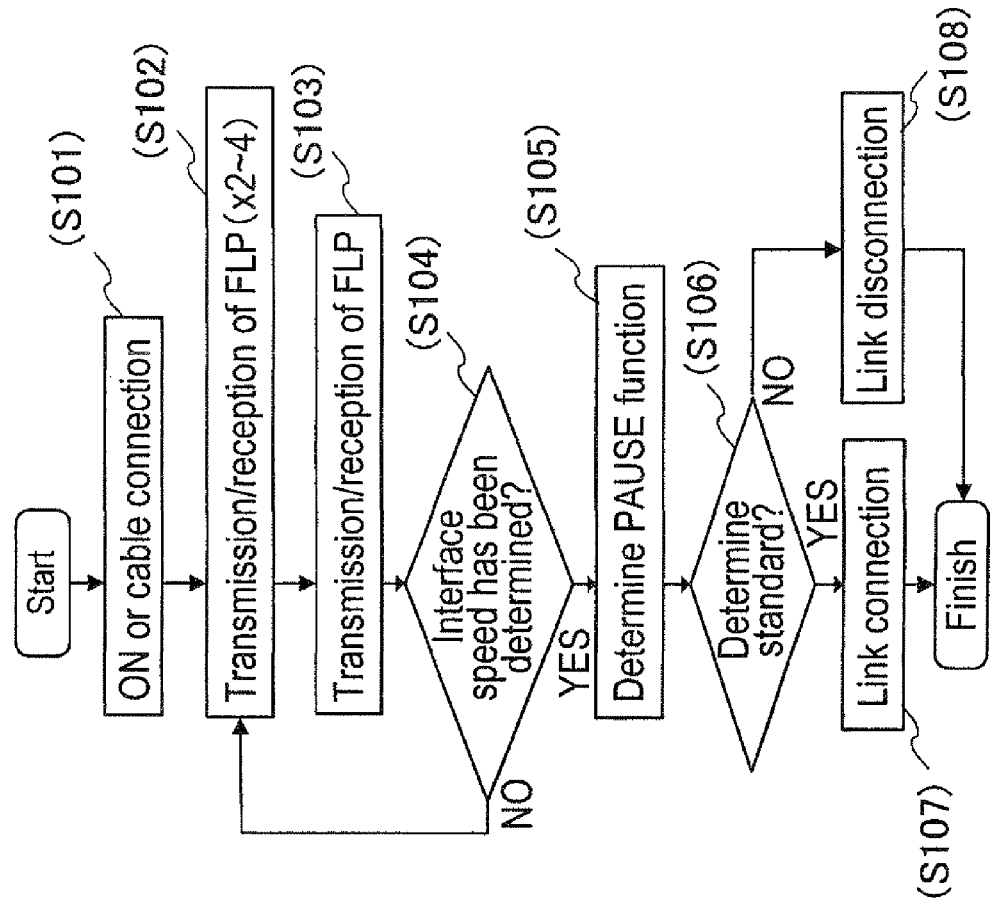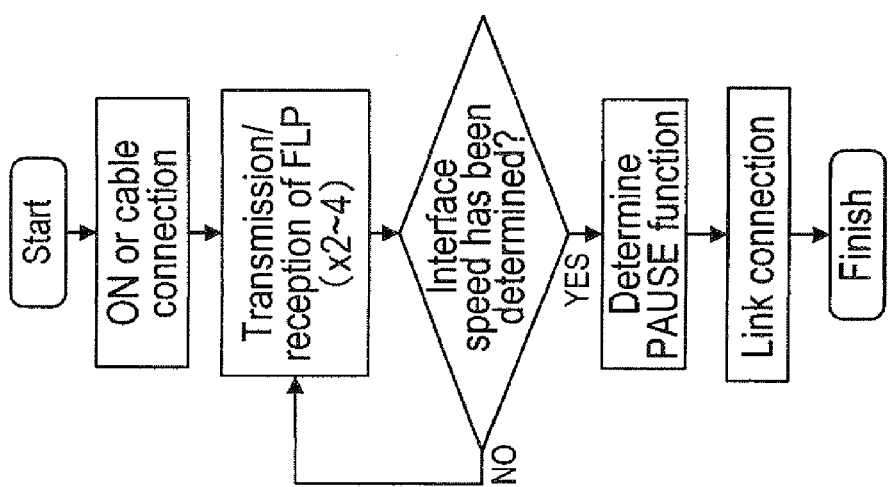

FIG. 7

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| | Selector field | | | | Technology ability field | | | | | | | | Control field | | |

Base page (First page)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| | Message code field | | | | | | | | | | Control field | | | | |

Message page (Second page)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| | Unformatted code field | | | | | | | | | | Control field | | | | |

Unformatted page (Third and subsequent pages)

FIG. 8

| Priority order | 1000Base-T (full) | 1000Base-T (half) | 100Base-T2 (full) | 100Base-TX (full) | 100Base-T2 (half) | 100Base-T4 | 100Base-TX (half) | 10Base-T (full) | 10Base-T (half) |
|---|---|---|---|---|---|---|---|---|---|
| 1 | PROFINET | PROFINET | PROFINET | PROFINET | PROFINET | PROFINET | PROFINET | MECHATROLINK-II | MECHATROLINK-II |
| 2 | CC-Link IE | CC-Link IE | HSE | HSE | FL-net | HSE | FL-net | Modbus TCP/IP | Modbus TCP/IP |
| 3 | Modbus TCP/IP | Modbus TCP/IP | Modbus TCP/IP | Modbus TCP/IP | Modbus TCP/IP | Modbus TCP/IP | Modbus TCP/IP | FL-net | FL-net |
| 4 | FL-net | FL-net | MECHATROLINK-III | MECHATROLINK-III | MECHATROLINK-III | MECHATROLINK-III | MECHATROLINK-III | PROFINET | PROFINET |

Interface speed

Priority order ically-connected nodes conform to different industrial Ethernet standards, one node may transmit data to a transmission destination node with a rule different from the rule specified by a control protocol of the industrial Ethernet that the connection destination node uses. In this case, the one node (transmission source node) transmits data at an unexpected timing and in an unexpected format to the transmission destination node. In the case where nodes that conform to different industrial Ethernet standards are connected to each other in one system as described above, the system may be confused.
NODE, SWITCH, AND SYSTEM

CROSS-REFERENCE TO RELATED APPLICATION

This application is based upon and claims the benefit of priority from the prior Japanese Patent Application No. 2010-217268 filed on Sep. 28, 2010, the entire contents of which are incorporated herein by reference.

FIELD

Embodiments described herein relate generally to a node, a switch, and a system.

BACKGROUND

The application field of Ethernet (registered trademark; hereinafter omitted) has widely expanded due to its various advantages as a communication standard. For example, Ethernet starts to be used not only in so-called an information system for office use, but also in a system for industrial use. Ethernet used in the system for industrial use is generally called "industrial Ethernet". The industrial Ethernet, which is based on an Ethernet technology, has a function of realizing real-time response performance required in the system for industrial use. For the industrial Ethernet, ten or more different standards have been created by various standards groups including IEC (International Electrotechnical Commission). In recent years, new industrial Ethernet standards are created in association with Smart Grid.

A common physical layer is adopted in the industrial Ethernet, so that nodes can physically be connected by plugging cables into each other. However, in the case where the physically-connected nodes conform to different industrial Ethernet standards, one node may transmit data to a transmission destination node with a rule different from the rule specified by a control protocol of the industrial Ethernet that the connection destination node uses. In this case, the one node (transmission source node) transmits data at an unexpected timing and in an unexpected format to the transmission destination node. In the case where nodes that conform to different industrial Ethernet standards are connected to each other in one system as described above, the system may be confused.

Although the industrial Ethernet standards have been exemplified in the above description, such a problem is not limited to the industrial Ethernet standards. That is, it can be considered that such a problem occurs when nodes that conform to different Ethernet standards are connected to one system.

BRIEF DESCRIPTION OF THE DRAWINGS

FIG. 4A is a flowchart illustrating operation at the time of execution of the conventional auto-negotiation and FIG. 4B is a flowchart illustrating operation at the time of execution of the auto-negotiation in a system according to the first embodiment;

FIG. 7 is a data format of each page used in the auto-negotiation;

FIG. 8 is an example of a table representing the correspondence between a combination of an interface speed and a communication scheme and the priority order among industrial Ethernet standards;

DETAILED DESCRIPTION

Figure 1:
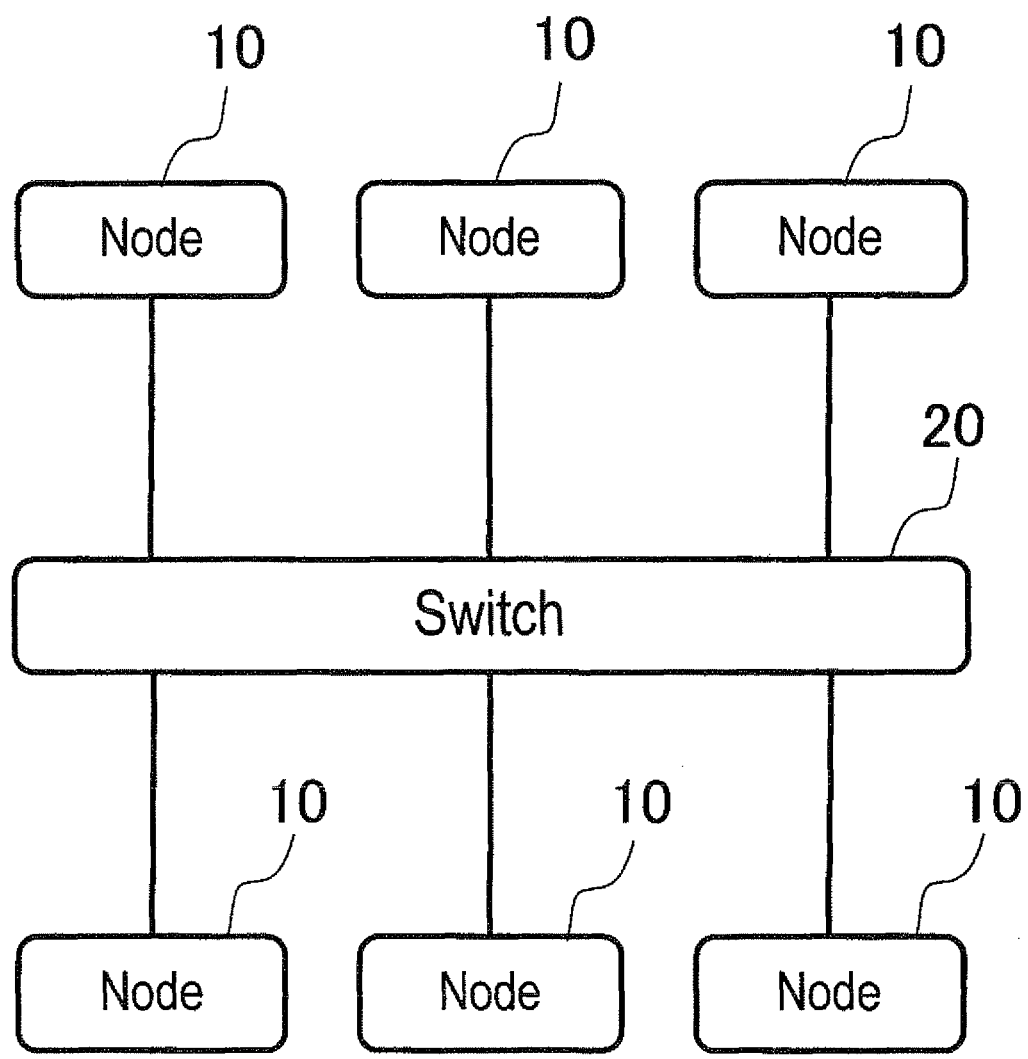
FIG. 1 is a view illustrating an industrial Ethernet system according to a first embodiment.

According to one embodiment, a node is capable of conforming to one of a plurality of Ethernet standards and includes: an Ethernet controller unit that performs auto-negotiation with a switch to exchange information concerning an interface speed, to determine an interface speed to be used based on the information concerning the interface speed, and to receive information including a setting Ethernet standard set as an Ethernet standard to be used; a storage unit that stores the node's available Ethernet standard which is an Ethernet standard to which the node can conform; and a controller that performs setting such that the node operates using a coincident standard between the Ethernet standard stored in the storage unit and setting Ethernet standard and connects a link to the switch.

Hereinafter, embodiments of the present invention will be described with reference to the accompanying drawings. Throughout the drawings, the same reference numerals refer to the same or similar parts, and redundant descriptions are omitted.

First Embodiment

FIG. 1 is a view illustrating an industrial Ethernet system according to a first embodiment of the present invention.

The industrial Ethernet system is a network including a plurality of nodes 10 and one (or a plurality of) switch 20.

Industrial Ethernet standards are previously set in the switch 20. The industrial Ethernet standards previously set in the switch 20 are referred to as "switch-setting Ethernet standards". The nodes 10 are then connected to the switch 20, whereby the industrial Ethernet system is constructed.

Hereinafter, the industrial Ethernet standards will be described with reference to FIG. 12.

Figure 12:
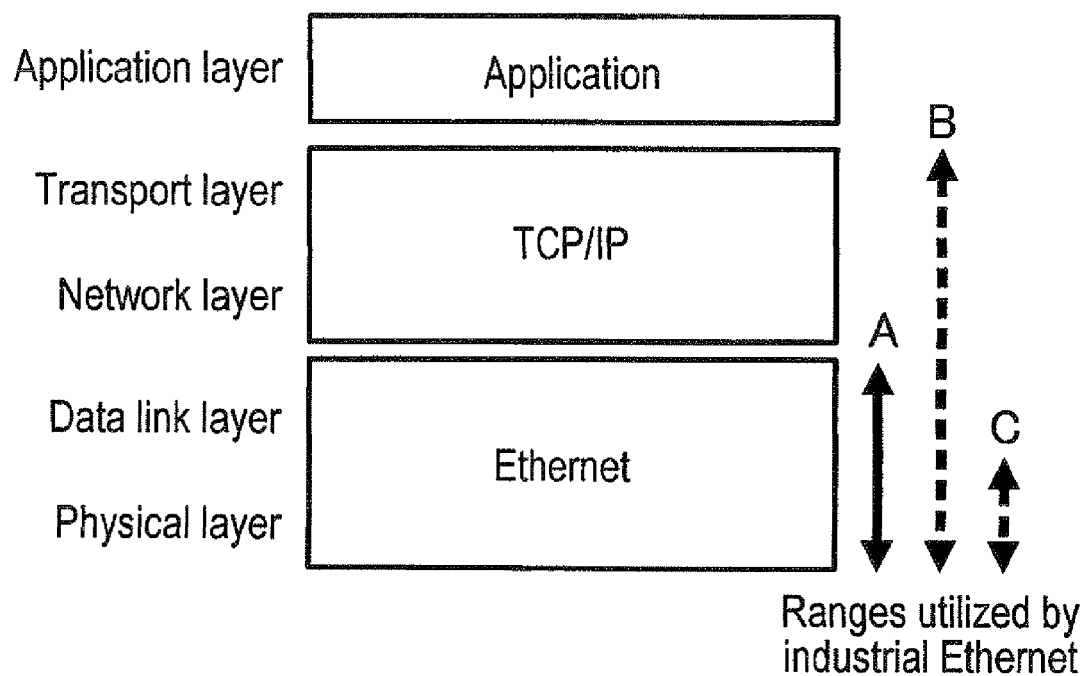
FIG. 12 is a view illustrating a protocol hierarchy of industrial Ethernet.

FIG. 12 illustrates an example of a comparison between a protocol hierarchy (using a combination of "Ethernet" which is a physical standard and "TCP/IP protocol" which is a protocol specifying communication contents) commonly used for office use, etc., and a protocol hierarchy of the industrial Ethernet. In the industrial Ethernet, as denoted by an arrow A of FIG. 12, a physical layer and a data link layer of the Ethernet are utilized in common, and a control protocol operating thereon is defined for each standard. Alternatively, as denoted by an arrow B of FIG. 12, there may be a case where a TCP/IP technology is utilized without change in a network layer or transport layer like a protocol hierarchy commonly used for office use, etc. Alternatively, as denoted by an arrow C of FIG. 12, there may a case where only the physical layer of Ethernet is utilized, and layers higher than the physical layer are defined for each standard. In the following description, the industrial Ethernet is specified as "communication technology that adopts an Ethernet technology as the physical layer/data link layer of communication" as described above, and three standards represented by the arrows A, B, and C are treated without distinction.

The switch 20 is a switch in Ethernet and connects a plurality of nodes 10 to each other through a plurality of ports. The switch 20 transfers, to a node 10, data sent by another node 10.

The switch 20 is a component central to the industrial Ethernet system, and the setting for the system to use which one of the industrial Ethernet standards are previously made to the switch 20. That is, the switch-setting Ethernet standards are previously made.

The node 10 is a device that can perform communication in conformity with one or a plurality of the industrial Ethernet standards. Hereinafter, the standard to which the node 10 can conform for communication is referred to as "node's available Ethernet standard". In the case where the node's available Ethernet standard and switch-setting Ethernet standard coincide with each other at the time of connection to the switch 20, the node 10 performs link connection and operates using the switch-setting Ethernet standard. On the other hand, in the case where the node's available Ethernet standard and switch-setting Ethernet standard do not coincide with each other, the node 10 performs link disconnection.

A description is given here assuming that the system includes one switch 20; actually, however, a plurality of switches 20 may be provided. Assuming that switches 20A and 20B are provided in this order, the later-installed switch 20E behaves as a node with respect to the initially-installed switch 20A. In the case where there is a standard that coincides with the switch-setting Ethernet standard of the switch 20A as the industrial Ethernet standard to which the switch 20B can conform, the switch 20B performs link connection and operates using the switch-setting Ethernet standard. In the case where a new node 10 is connected to the switch 20B, the switch 20B behaves as a switch with respect to the newly-connected node 10. In the case where there is a standard that coincides with the switch-setting Ethernet standard of the switch 20B as the industrial Ethernet standard to which the newly-connected node 10 can conform, the newly-connected node 10 performs link connection. On the other hand, in the case where there is no standard that coincides with the switch-setting Ethernet standard of the switch 20B, the newly-connected node 10 performs link disconnection.

Figure 2:
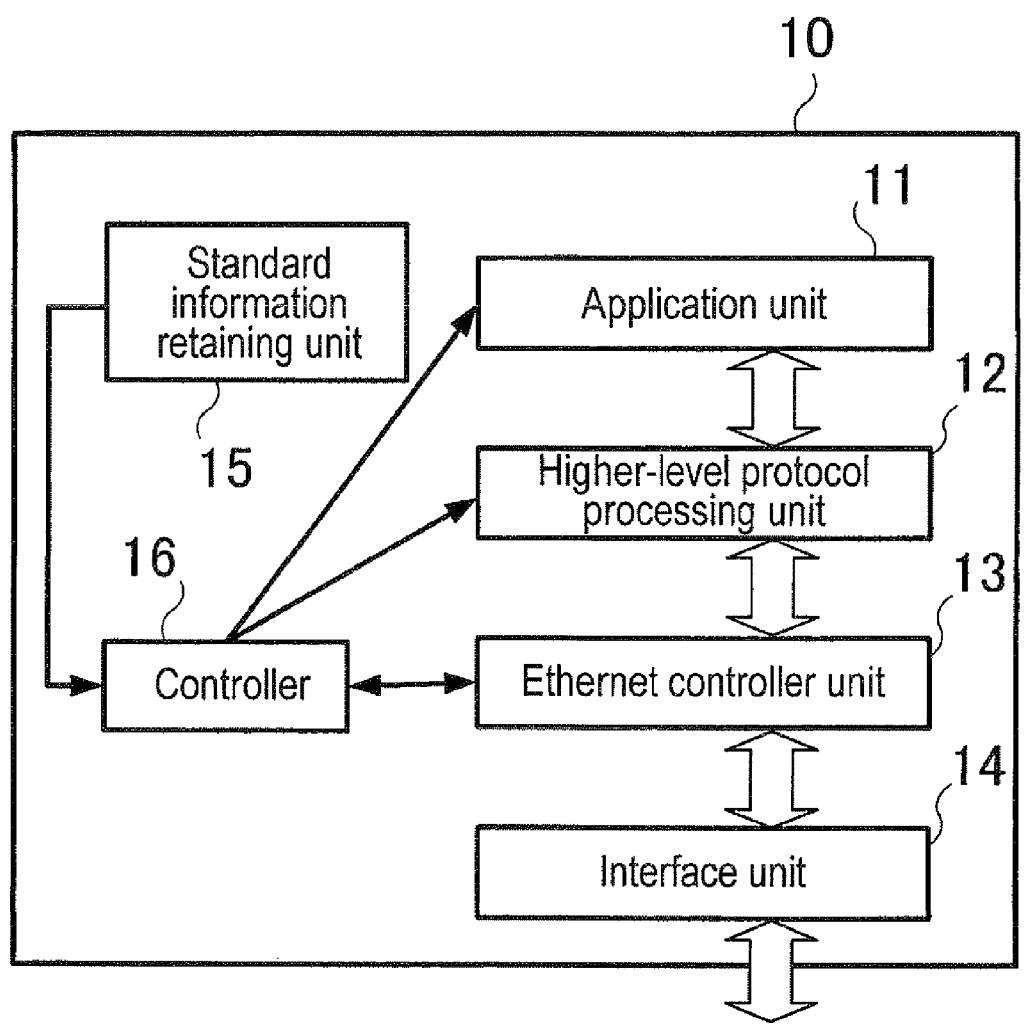
FIG. 2 is a block diagram illustrating a configuration of a node according to the first embodiment.

FIG. 2 is a block diagram illustrating a configuration of the node 10 according to the first embodiment of the present invention.

An application unit 11 executes application processing corresponding to the type of the system and node 10.

A higher-level protocol processing unit 12 executes protocol processing higher than Ethernet.

An Ethernet controller unit 13 executes Ethernet protocol processing. When executing auto-negotiation, the Ethernet controller unit 13 transmits/receives a FLP (Fast Link Pulse) through an interface unit 14. Further, after performing link connection, the Ethernet controller unit 13 performs data transmission/reception through the interface unit 14.

The interface unit 14 is an interface for transmission/reception of the FLP or data.

A controller 16 instructs the Ethernet controller unit 13 to perform the FLP transmission/reception or link-connection/disconnection. Further, after determining the industrial Ethernet standard to be used, the controller 16 issues an instruction to the application unit 11, higher-level protocol processing unit 12, and Ethernet controller unit 13 so that the node 10 executes processing corresponding to the determined industrial Ethernet standard.

A standard information retaining unit 15 retains information concerning the type of the industrial Ethernet standard to which the node 10 can conform. The standard information retaining unit 15 offers the retained information to the controller 16. The standard information retaining unit 15 may further retain information concerning the interface speed and interface communication scheme (full-duplex communication scheme or half-duplex communication scheme) and a PAUSE function (PAUSE or Asymmetric PAUSE) that Ethernet can support.

The controller 16 and standard information retaining unit 15 may be realized as a part of the Ethernet controller unit 13.

Figure 3:
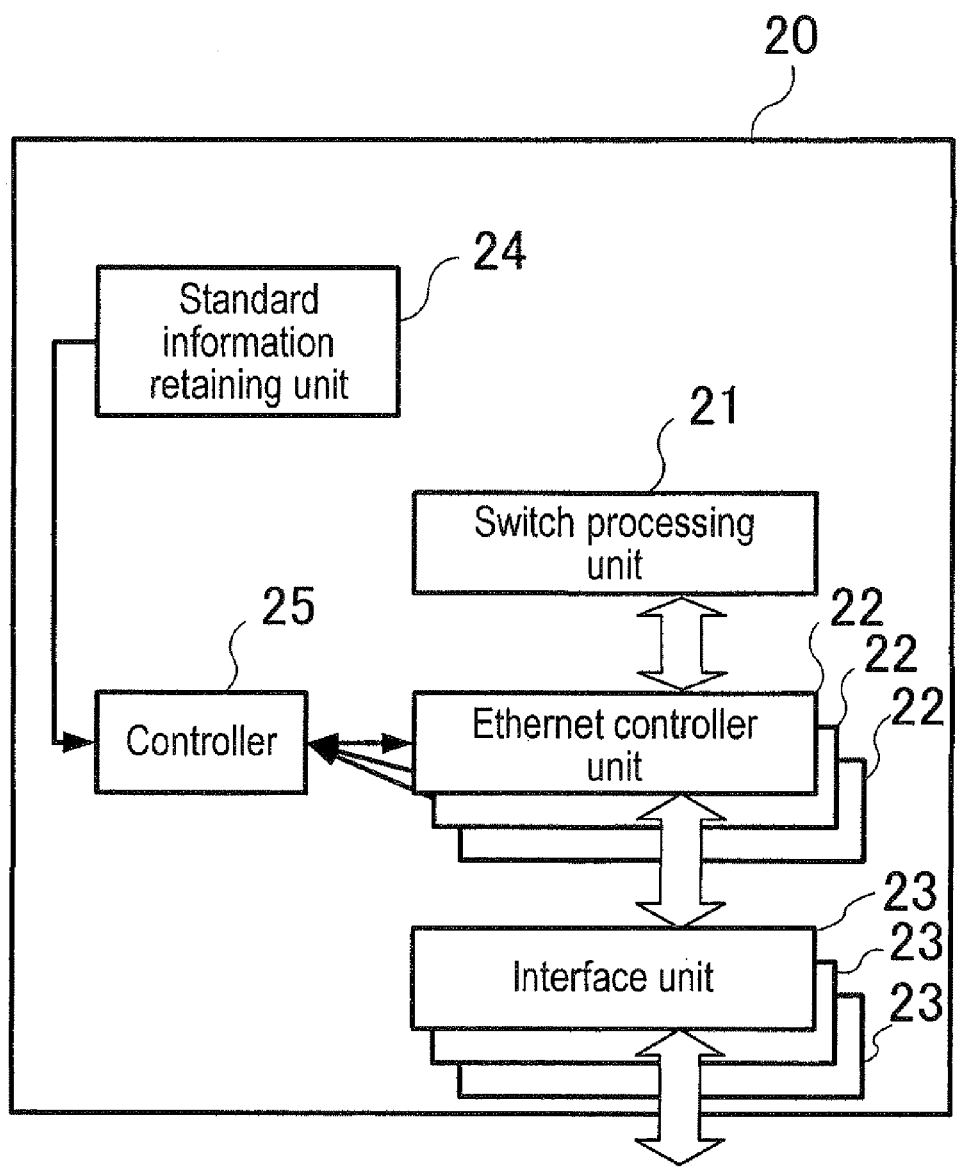
FIG. 3 is a block diagram illustrating a configuration of a switch according to the first embodiment.

FIG. 3 is a block diagram illustrating a configuration of the switch 20 according to the first embodiment of the present invention. The switch 20 has a plurality of ports (in the example of FIG. 3, each constituted by a combination of an interface unit 23 and an Ethernet controller unit 22).

A switch processing unit 21 performs data transfer processing between the nodes 10 connected to the plurality ports.

The Ethernet controller unit 22 executes Ethernet protocol processing. When executing auto-negotiation, the Ethernet controller unit 22 transmits/receives the FLP through an interface unit 23. Further, after performing link connection, the Ethernet controller unit 22 performs data transmission/reception through the interface unit 23.

The interface unit 23 is an interface for transmission/reception of the FLP or data.

A controller 25 instructs the Ethernet controller unit 23 to perform the FLP transmission/reception or link-connection/disconnection. Further, after determining the industrial Ethernet standard to be used, the controller 25 issues an instruction to the Ethernet controller unit 22 so that the switch 20 executes processing corresponding to the determined industrial Ethernet standard.

A standard information retaining unit 24 retains information concerning the type of the industrial Ethernet standard (which is referred to as "switch applicable Ethernet standard") to which the switch 20 can conform. Further, in the case where the switch 20 has already set the switch-setting Ethernet standard as the Ethernet standard used by the entire group of switches 20, the standard information retaining unit 24 retains this information. The standard information retaining unit 24 offers the retained information to the controller 25. The standard information retaining unit 24 may further retain information concerning the interface speed and interface communication scheme (full-duplex communication scheme or half-duplex communication scheme) and a PAUSE function (PAUSE or Asymmetric PAUSE) that Ethernet can support.

The controller 25 and standard information retaining unit 24 may be realized as a part of the Ethernet controller unit 22.

Next, with regard to the operation of the system according to the present embodiment, (1) Procedure according to which a user sets the switch-setting Ethernet standard for the switch 20; and (2) Procedure according to which the node 10 is connected to the switch 20 will be described below.

(1) Procedure According to which Switch-Setting Ethernet Standard is Set for Switch 20

In the case where there exists one standard to which the switch 20 can conform, the one standard is set as the switch-setting Ethernet standard.

In the case where the switch 20 can conform to a plurality of industrial Ethernet standards, the user sets a desired one of the plurality of industrial Ethernet standards for the switch 20.

There are two variations in the method of setting the switch-setting Ethernet standard, including a method in which a user makes the setting with respect to the switch 20 and a method in which the auto-negotiation between the switch 20 and the node 10 connected to the switch 20 is used to make the setting.

First, a method in which the user performs the setting will be described. A method in which the auto-negotiation between the switch 20 and the node 10 connected to the switch 20 is used to make the setting will be described later.

There are many variations in the method in which the user sets the switch-setting Ethernet standard for the switch 20. For example, the user uses an input device (button, etc.) provided in the switch 20 to make the setting. Alternatively, a PC serving as a console is connected to the switch 20 by a serial cable or the like so as to allow the user to make the setting for the switch 20 by operating the console.

In general, the number of the switch-setting Ethernet standards to be set for the switch 20 is one. However, in the case where a plurality of industrial Ethernet standards can be mixed, a plurality of switch-setting Ethernet standards can be selected. In the case where the switch 20 can select the plurality of switch-setting Ethernet standards, the switch 20 performs auto-negotiation for each port at the time of connecting to the node 10 to select one switch Ethernet standard to be used.

Further, simultaneously with the setting of the switch-setting Ethernet standard, switch general settings may be performed. The switch general settings include, e.g., settings of interface speed, communication scheme (full-duplex communication scheme or half-duplex communication scheme), statistics, and the like.

(2) Procedure According to which Node 10 is Connected to Switch 20

Hereinafter, operation in which the node 10 is connected to the switch 20 for which the switch-setting Ethernet standard has been set will be described. First, a case where the number of the switch-setting Ethernet standards set in the switch 20 is one will be described.

It is assumed that the node 10 can conform to one or a plurality of the industrial Ethernet standards.

The user connects the node 10 to one of the plurality of ports of the switch 20 using an Ethernet cable. Then, the node 10 performs Ethernet auto-negotiation with the switch 20. The node 10 and switch set the Ethernet physical layer through the Ethernet auto-negotiation. Concretely, the setting of the Ethernet physical layer refers to the settings of interface speed, communication scheme, coding method, PAUSE function, and the like. The above items are set in a commonly available manner between the switch 20 and node 10. Further, in the present embodiment, information of the switch-setting Ethernet standard of the switch 20 and information of the industrial Ethernet standard (node's available Ethernet standard) to which the node 10 can conform are exchanged in the auto-negotiation. Then, in the case where any one of the node's available Ethernet standards and switch-setting Ethernet standard of the switch 20 coincide with each other, the node 10 adopts this standard and connects a link to the switch 20. The switch 20 also connects a link to the node 10. On the other hand, in the case where the node's available Ethernet standard and switch-setting Ethernet standard of the switch 20 do not coincide with each other, the node 10 and switch 20 disconnect a corresponding Ethernet link between them.

The node 10 to which an Ethernet link is connected is connected to the switch 20 and thus can perform transmission/reception of data with another node 10 according to the switch-setting Ethernet standard. On the other hand, the node 10 from which an Ethernet link is disconnected cannot perform data transmission/reception at all with another node 10.

A case where the number of the switch-setting Ethernet standards set in the switch 20 is two or more will be described. Also in this case, auto-negotiation is performed between the node 10 and switch 20. Then, in the case where there is any coincident standard between the industrial Ethernet standards to which the node 10 can conform and switch-setting Ethernet standards of the switch 20 and where the number of the coincident standards is one, the switch 20 and node 10 adopt the coincident, one and connect a corresponding Ethernet link between them. On the other hand, there are a plurality of the coincident standards, the node and switch 20 select one standard based on the priority and adopt the selected one and then connect a corresponding Ethernet link between them. The details of processing in which the node 10 selects one standard based on the priority will be described later.

Next, a procedure of the auto-negotiation performed when the node 10 is connected to the switch will be described. FIG. 4B is a flowchart illustrating operation at the time of execution of the auto-negotiation in the system according to the first embodiment.

Execution of the auto-negotiation is started when a cable is connected between the node 10 and switch 20 or when both network controllers of the node 10 and switch 20 are activated (S101). Then, the node 10 and switch 20 exchange electrical signals (pulses) called FLPs therebetween so as to perform data exchange for the auto-negotiation (S102). One data is exchanged between the node 10 and switch 20 two or four times depending on the type of the interface speed at which the auto-negotiation is performed. In the system of the present embodiment, in addition to the data exchange performed in conventional auto-negotiation (shown in FIG. 4A), data exchange for exchanging information of the industrial Ethernet standard is performed (S103).

From among a plurality of the interface speeds and a plurality of communication schemes that both the node 10 and switch 20 support, the node 10 and switch select the interface speed and communication speed that have the highest priority in the received FLPs, respectively (S104). If there is no coincident interface speed and communication scheme, the flow returns to S102, where the FLPs are exchanged once again.

After determining the interface speed and communication scheme, the node 10 and switch 20 determine PAUSE functions to be used, respectively, from PAUSE functions to which the node 10 and switch 20 respectively correspond (S105). In this case, the PAUSE functions of the node 10 and switch 20 need not coincide with each other and, thus, the flow does not return to S102.

After determining the PAUSE functions, the node 10 and switch 20 determine from the received FLPs in S103 whether there is any coincident standard between the switch-setting Ethernet standards of the switch 20 and node's available Ethernet standards. When determining that there is any coincident standard, the node 10 and switch 20 select the standard having the highest priority, followed by connection of a link (the details of a selection procedure based on the priority will be described later) (S106, S107). On the other hand, if there is no coincident standard between the switch-setting Ethernet standards and node's available Ethernet standards, the node 10 and switch 20 disconnect a corresponding Ethernet link between them (S108).

Figure 5:
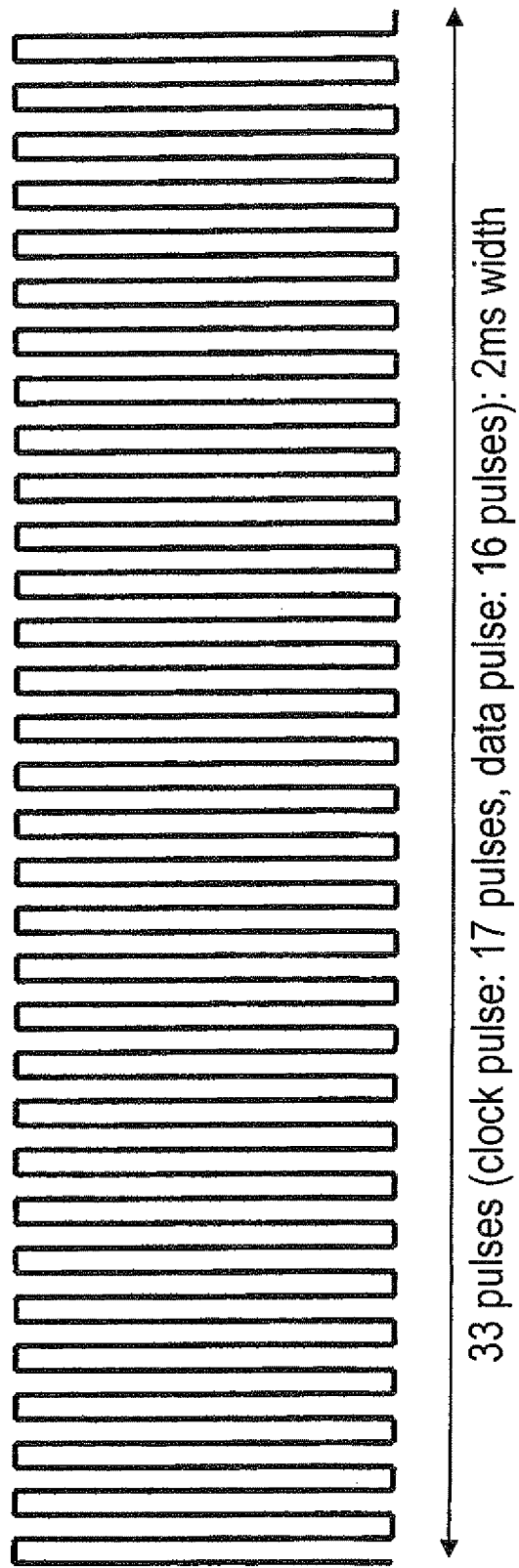
FIG. 5 is a view illustrating an example of an FLP.

Next, the details of the auto-negotiation will be described. Data exchanged by the auto-negotiation is the FLP (Fast Link Pulse), which is constituted by 33 electrical pulses. FIG. 5 illustrates an example of the FLP. The odd-number pulses (17 pulses) of the FLP are used for adjusting the timing between the node 10 and switch 20, and even-numbered pulses (16 pulses) are used as data pulses representing information for the negotiation.

A message format exchanged by 16 pulses of the FLP is called "page". Data exchange of one page corresponds to 16-bit data exchange. A reception of the page is completed when a page of the same content (excluding some pieces of control information) has been received three times or more. When both the node and switch 20 have completed the reception of a page, an exchange of the page between them has completed. Whether the partner has received or not the page three times or more can be confirmed by referring to Ack information (to be described later) of a control field in the page. When the exchange of the page has been completed, an exchange of the next page is started or the sequence of the auto-negotiation is ended according to the control information of the page.

Figure 6:
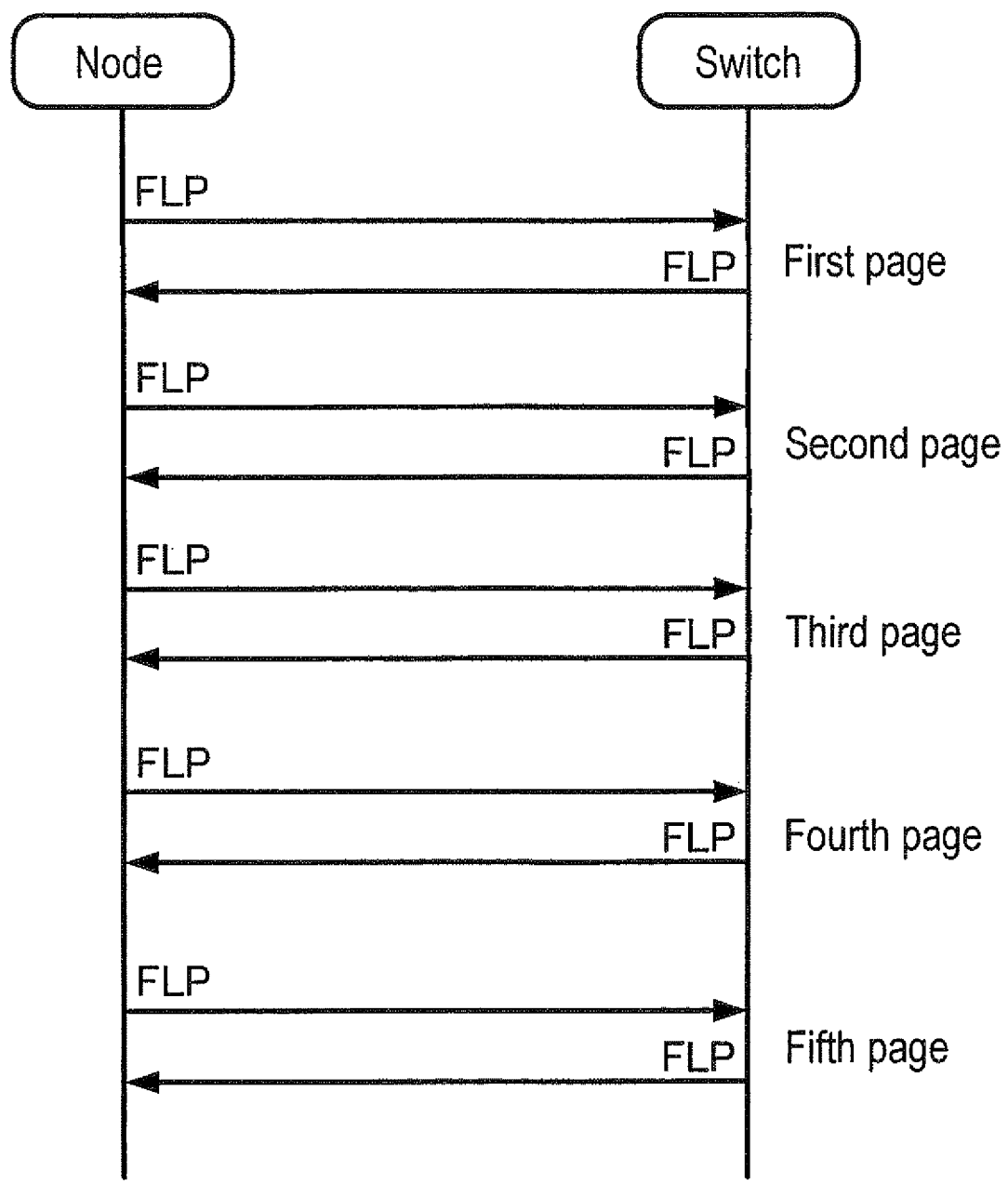
FIG. 6 is a sequence diagram at the time of execution of the auto-negotiation.

FIG. 6 is a sequence diagram at the time of execution of the auto-negotiation, and FIG. 7 is a data format of each page.

As illustrated in FIG. 7, a first page (base page) is composed of a selector field, a technology ability field, and a control field. The selector field represents the type of an interface used in the auto-negotiation. For example, in the case of Ethernet (IEEE802.3), the value of the selector field is 10000. As the value of the selector field, a value (e.g., 00111) for future extension may be used. The technology ability field represents ability information of the interface. Concretely, information of which combination of the interface speed and communication scheme (10 Base-T half-duplex, 10 Base-T full-duplex, 100 Base-TX half-duplex, 100 Base-TX full-duplex, 100 Base-T4 half-duplex) the transmission source (node 10 or switch 20) of the FLP supports or not and information of which PAUSE function (PAUSE, Asymmetric PAUSE) the transmission source supports or not are stored. The control field is composed of link failure notification information, Ack information, and next-page information (information indicating that there still exists the page to be transmitted). The Ack information is set in the case where the same information has been received three times or more from the partner. Since second and subsequent pages follow the first page, the next-page information is set in the control field of the first page.

A second page (message page) is composed of a message code field and a control field. The message code field is similar to the technology ability field and represents ability information of the interface. Concretely, information of whether the transmission source (node 10 or switch 20) supports or not the abilities (interface speeds) of 100 Base-T2 and 1000 Base-T is stored. The control field has the same configuration as that of the base page.

A third page (unformatted page) is composed of an unformatted field and a control field. The unformatted field stores, as information for setting a 1000 Base-T interface, information of whether the transmission source (node 10 or switch 20) supports the full-duplex or half-duplex as the communication scheme and information of whether an interface master/slave setting is performed automatically or manually. The control field has the same configuration as that of the base page.

A fourth page (unformatted page) is composed of an unformatted field and a control field as the third page. Seed information required for performing the master/slave setting is stored in the unformatted field as information for setting a 1000 Base-T interface. The control field has the same configuration as that of the base page.

A fifth page (unformatted page) is composed of an unformatted field and a control field as the third page. The unformatted field stores information concerning the type of the industrial Ethernet standard that the transmission source (node 10 or switch 20) supports. Concretely, information of whether the transmission source (node 10 or switch 20) supports or not specification of, e.g., Profinet, TC Net, CC-Link IE, HSE, FL-net, Modbus TCP/IP, MECHATROLINK-III, MECHATROLINK-II, and Ethernet/IP is stored. It is assumed that the information of the industrial Ethernet standard that the node 10 supports corresponds to information of the industrial Ethernet standard to which the node 10 can conform, in general. Further, it is assumed that the information of the industrial Ethernet standard that the switch 20 supports corresponds to information of the switch-setting Ethernet standard the case where the switch-setting Ethernet standard has already been set in the switch 20. On the other hand, it is assumed that the information of the industrial Ethernet standard that the switch 20 supports corresponds to the industrial Ethernet standard to which the switch can conform in the case where the switch-setting Ethernet standard has not yet been set in the switch 20.

In the case where the switch 20 is the transmission source, a communication data size (byte unit) (in the case where the switch 20 supports MECHATROLINK-III), a communication cycle (usec unit) (in the case where the switch 20 supports Profinet), and other parameters (e.g., the number of time slots, the number of continuous transmission packets, the number of multiplications of a synchronous signal) may be included in the unformatted field. The control field has the same configuration as that of the base page.

In the case where the fifth page is the last page, the next-page information is not set in the control field. On the other hand, in the case where information to be set in the unformatted field cannot be fit in the fifth page, the next-page information is set in the control field. In this case, a sixth page which is an unformatted page may be used for data exchange.

When transmission/reception of the above first to fifth pages (or first to sixth pages) has been completed, the sequence executed in the auto-negotiation is completed.

Based on the information acquired in the auto-negotiation, the node 10 (and switch 20) determines a combination of the interface speed and communication scheme to be used. In this processing, the combination of the interface speed and communication scheme that both the node 10 and switch 20 support and that has the highest priority is selected. The priority among the combinations of the interface speed and communication scheme is fixedly determined. The priority is, in descending order, 1000 Base-T full-duplex, 1000 Base-T half-duplex, 100 Base-T2 full-duplex, 100 Base-TX full-duplex, 100 Base-T4 half-duplex, 100 Base-TX half-duplex, 10 Base-T full-duplex, 10 Base-T half-duplex. If there is no combination of the interface speed and communication scheme that both the node 10 and switch 20 support, data exchange using the FLP is performed once again. In the case where 1000 Base-T has been determined as the interface speed, setting of the master/slave is performed. In the case where the master/slave setting is automatically performed, the master and slave are determined by comparing the values of each other's seed information.

Then, the node 10 (and switch 20) determines the PAUSE function to be used. The PAUSE function is determined based on whether the node 10 and switch 20 support or not the PAUSE function and Asymmetric PAUSE function, respectively.

Then, the node 10 and switch 20 determine whether they perform a link connection or link disconnection. In the case where the node 10 and switch 20 perform a link connection, they determine the industrial Ethernet standard to be used.

In the case where the number of the coincident standards between the switch-setting Ethernet standard set in the switch 20 and industrial Ethernet standards to which the node 10 conforms is one, the node 10 and switch 20 perform setting so as to operate using the switch-setting Ethernet standard and then perform link connection.

In the case where a plurality of the switch setting Ethernet standards are set in the switch 20 and where there is a plurality of the coincident standards between the switch-setting Ethernet standards and industrial Ethernet standards to which the node 10 conforms, the node 10 and switch 20 determine the industrial Ethernet standard to be used based on the priority. There are variations in the method of determining the industrial Ethernet standard to be used based on the priority. A first method is a method that fixedly defines the priority among the industrial Ethernet standards and selects one based on the defined priority. A second method is a method that previously defines the priority among the industrial Ethernet standards in accordance with the interface speed, communication scheme, PAUSE function, and the like and selects the high-priority industrial Ethernet standard in accordance with the determined interface speed, communication scheme, PAUSE function, and the like.

FIG. 8 is an example of a table representing the correspondence between the combination of the interface speed and communication scheme and the priority order among the industrial Ethernet standards. It is assumed in the table of FIG. 8 that industrial Ethernet standards not listed in the column corresponding to the combination of the interface speed and communication scheme are unusable standard. The table as illustrated in FIG. 8 is stored in the standard information retaining units 15 and 24 of the node 10 and switch 20.

Hereinafter described will be an example of a method that determines, after determining the combination of the interface speed and communication scheme, the industrial Ethernet standard to be used by using the determined combination of the interface speed and communication scheme and the priority table of FIG. 8. As illustrated in FIG. 8, in the case where, for example, the combination of the interface speed and communication scheme is [1000 Base-T (full-duplex)], available industrial Ethernet standard are PROFINET, CC-Link IE, Modbus TCP/IP, and FL-net in descending order in terms of the priority, and standards other than these cannot be used. Thus, when [1000 Base-T (full-duplex)] is determined as the interface speed in the case where PROFINET and FL-net are taken as the coincident standards between the industrial Ethernet standards to which the node 10 can conform to and switch-setting Ethernet standards set in the switch 20, the node 10 and switch 20 select the higher-priority standard, i.e., PROFINET, followed by connection of a link.

Further, in FIG. 8, the industrial Ethernet standard CC-Link IE is a standard used when the 1000 Base-T (full-duplex) or 1000 Base-T (half-duplex) is determined as the interface speed, and it turns out that the CC-Link IE is a standard prepared on the assumption that 1000 Base-T is used as the interface speed. Thus, when the interface speed is not 1000 Base-T, the CC-Link IE cannot be selected even if both the node 10 and switch 20 support CC-Link IE.

Further, as illustrated in FIG. 8, although there is no constraint on the use of Modbus TCP/IP in terms of the interface speed, Modbus TCP/IP is a standard used mainly for a low-speed interface such as 10 Base-T in general. That is, in the case where the interface speed is 10 Base-T, the priority of Modbus TCP/IP is set high, while in the case where the interface speed is a high-speed interface such as 1000 Base-T, the priority of Modbus TCP/IP is set low.

Parameters in each industrial Ethernet standard need not be previously determined uniquely with respect to the industrial Ethernet standard, but may be determined in accordance with the selected interface speed, communication scheme, and PAUSE function. For example, the following parameter settings may be made. That is, in the case where MECHATROLINK-III is adopted as the industrial Ethernet standard, the communication data size is set small when the combination of the interface speed and communication scheme is [100 Base-TX (half-duplex)], while the communication data size is set large when the combination of the interface speed and communication scheme is [100 Base-TX (full-duplex)]. Further, for example, in the case where Profinet is adopted as the industrial Ethernet standard, the communication cycle is set short for 1000 Base-T and set long for 10 Base-T.

Although the priority order among the industrial Ethernet standards is set for each combination of the interface speed and communication scheme in the example of FIG. 8, the present invention is not limited to this. For example, the priority order among the industrial Ethernet standards may be set only for the interface speed or may be set for each combination of the interface speed, communication scheme, and PAUSE function.

Figure 9:
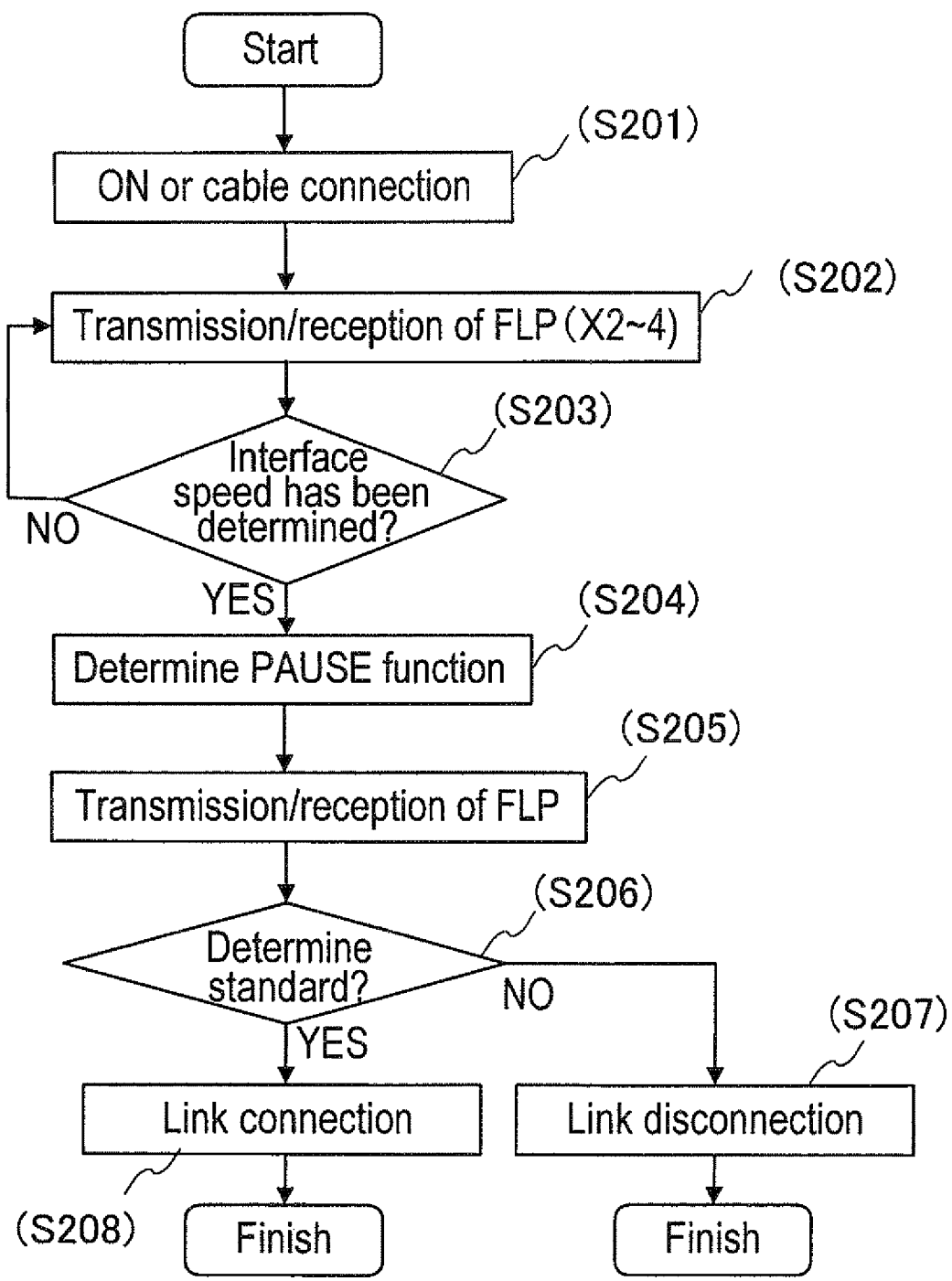
FIG. 9 is a flowchart illustrating a second example of the operation in the system according to the first embodiment.

Next, an example in which the auto-negotiation is performed in a different manner from the one described above will be described. FIG. 9 is a flowchart illustrating a second example of the operation in the system according to the first embodiment. In the flowchart of FIG. 4B, the combination of the interface speed and communication scheme, PAUSE function, and industrial Ethernet standard are all determined after exchange of FLP data are entirely completed. However, as illustrated in FIG. 9, a procedure may be adopted, in which the FLP data exchange concerning the combination of the interface speed and communication scheme and PAUSE function is performed so as to determine the combination of the interface speed and communication scheme and PAUSE function, and then the FLP data exchange concerning the industrial Ethernet standard is performed so as to determine the industrial Ethernet standard. Although the processing order in the flowchart of FIG. 9 differs from that in the flowchart of FIG. 4B, the processing contents are the same, so that descriptions of the flowchart of FIG. 9 will be omitted here. In the case where such a procedure is adopted, it is possible to change the content of data to be transmitted in the FLP data exchange concerning the industrial Ethernet standard depending on the combination of the interface speed and communication scheme that has already been determined. This will be described with reference to FIG. 8. As is clear from FIG. 8, in the case where the interface speed is [10 Base-T (full-duplex or half-duplex)], CC-Link IE cannot be used as the industrial Ethernet standard. Thus, in the case where 10 Base-T is determined as the interface speed by the FLP data exchange, the node 10 or switch 20 cannot use CC-Link IE. Therefore, when determining 10 Base-T as the interface speed by the FLP data exchange, the node 10 and switch 20 need not include information indicating that they support CC-link IE in the data transmitted in the FLP data exchange concerning the industrial Ethernet standard.

After the interface speed and communication scheme, PAUSE function, and industrial Ethernet standard to be used have been all determined through the abovementioned procedure, the node 10 and switch 20 perform link connection. With the above procedure, the node 10 adequately selects a standard (i.e., switch-setting Ethernet standard and parameters) operated on a system in which the node 10 is installed from a plurality of industrial Ethernet standards to which the node 10 can conform and then performs link connection.

On the other hand, in the case where the industrial Ethernet standard to be used is not determined (that is, there is no industrial Ethernet standard that can be used in common between the node and switch 20), the switch 20 (and node 10) performs link-disconnection from the port (link) even if the interface speeds thereof coincide with each other.

Thus, the node 10 performs link disconnection when the industrial Ethernet standard to which the node 10 can conform does not correspond to the switch-setting Ethernet standard previously set in the switch 20, while it performs link connection when correspond to. Thus, in an industrial Ethernet system, it can be guaranteed that only the node that can conform to the switch-setting Ethernet standard is connected. Even if a node that cannot conform to the switch-setting Ethernet standard is erroneously added to the system, the connection of this node is not made, thereby preventing the system from being confused. That is, it is possible to avoid the node 10 that may perform data transmission at a timing or in a format that does not conform to the industrial Ethernet standard (switch-setting Ethernet standard) to which the system conforms from being connected to the system. Further, when the node 10 that can conform to a plurality of industrial Ethernet standards is connected to the system, the node 10 is automatically set so as to utilize the switch-setting Ethernet standard of the switch 20, thus eliminating the need for a user (system builder) to set the standard for each node 10, which simplifies the installation of the node 10.

Next, a method of changing the industrial Ethernet standard set in the switch 20 or the parameters thereof while the industrial Ethernet system (after completion of the auto-negotiation) is in operation will be described. In this case, a user (system builder) inputs a desired industrial Ethernet standard (new switch-setting Ethernet standard) or parameters to the switch 20. After that, the user instructs the switch 20 to validate the change. At this time, the switch 20 once performs link disconnection from all the ports to which the nodes 10 are connected and then performs link connection again. In the course from the link disconnection to link connection, the auto-negotiation is performed once again so as to execute the procedure of determining the new switch-setting Ethernet standard and parameters thereof. The method of executing the auto-negotiation is the same as that described above, so that the descriptions thereof will be omitted. When performing link disconnection from the port, the switch 20 may delay the execution of the link disconnection if any of the nodes 10 is in a communication state. In this case, the switch 20 performs link disconnection after confirming that communications of all the nodes 10 have been completed, followed by re-execution of the auto-negotiation.

In the above description, a user (system builder) previously sets, for the switch 20, the industrial Ethernet standard (switch-setting Ethernet standard) to be adopted in the system and parameters thereof. However, as described below, the switch-setting Ethernet standard and parameters thereof may be determined by a node 10 connected first to the switch 20.

In the following, a description will be given taking a case where the switch 20 can accept all industrial Ethernet standards in its initial state as an example. The switch 20 performs auto-negotiation with a node 10 connected first to the switch 20. The auto-negotiation execution method is as described above. The switch 20 receives the industrial Ethernet standards to which the node 10 can conform in the fifth page of the ELF. The switch 20 then selects the highest-priority standard from the standards notified from the node 10 and adopts it as the switch-setting Ethernet standard. In the case where the switch 20 can set a plurality of switch-setting Ethernet standards, the switch 20 selects a plurality of higher-priority standards from the standards notified from the node 10 and adopts them as the switch-setting Ethernet standards. The selection procedure based on the priority is as described above, and descriptions thereof will be omitted.

Next, a case where the industrial Ethernet standard to which the switch 20 can conform is limited will be described. The switch 20 performs auto-negotiation with a node 10 connected first to the switch 20. The method of executing the auto-negotiation is the same as that described above. In the auto-negotiation, the switch 20 receives an industrial Ethernet standard to which the node 10 can conform in the fifth page of the FLP. Then, in the case where there is any coincident standard between the standards notified from the node 10 and industrial Ethernet standards to which the switch 20 can conform, the switch 20 sets the highest-priority standard among the coincident standards as the switch-setting Ethernet standard. On the other hand, in the case where there is no coincident standard, the switch 20 does not set the switch-setting Ethernet standard between itself and the node 10 connected first to the switch 20 but determines the switch-setting Ethernet standard between itself and a node 10 connected secondly to the switch 20 in the same manner.

After determining the switch-setting Ethernet standard, the switch 20 reports information including only the switch-setting Ethernet standard in the fifth page through the auto-negotiation with each of the subsequently-connected nodes 10.

Although a case where the switch-setting Ethernet standard is determined between the switch 20 and a node 10 connected first to the switch 20 has been described, the present invention is not limited to this. That is, the switch 20 can determine the switch-setting Ethernet standard between itself and a node 10 connected to the switch 20 at a stage when the switch setting Ethernet standard has not been determined.

Further, although each of the nodes 10 can conform to a plurality of industrial Ethernet standards, there may exist nodes 10 each of which can conform to only a single industrial Ethernet standard in the system.

Further, although the industrial Ethernet standard has been taken as an example of the Ethernet standard in the above description, the present embodiment can be applied not only to the industrial Ethernet standard, but also to all the Ethernet standards that adopt the Ethernet technology as the physical layer/data link layer of communication.

The node 10 can be realized by using, e.g., a general-purpose computer having the interface unit 14 as basic hardware. That is, the application unit 11, higher-level protocol processing unit 12. Ethernet controller unit 13, controller 16, and standard information retaining unit 15 can be realized when a processor mounted on the computer having the interface unit 14 executes a program. In this case, the node 10 may be realized by previously installing the program in the computer or by storing the program in a storage medium such as a CD-ROM or distributing the program through a network so as to install the program in the computer as needed. Further, the standard information retaining unit 15 can be realized by utilizing a memory, a hard disk, or a storage medium, such as a CD-R, CD-RW, DVD-RAM, or DVD-R, incorporated in or externally attached to the computer as needed.

Further, the switch 20 can be realized by using, e.g., a general-purpose computer having the interface unit 23 as basic hardware. That is, the switch processing unit 21, Ethernet controller unit 22, interface unit 23, controller 25, and standard information retaining unit 24 can be realized when a processor mounted on the computer having the interface unit 23 executes a program. In this case, the switch may be realized by previously installing the program in the computer or by storing the program in a storage medium such as a CD-ROM or distributing the program through a network so as to install the program in the computer as needed. Further, the standard information retaining unit 24 can be realized by utilizing a memory, a hard disk, or a storage medium, such as a CD-R, CD-RW, DVD-RAM, or DVD-R, incorporated in or externally attached to the computer as needed.

As described above, according to the system of the present embodiment, the nodes conforming to different Ethernet standards are connected to one system while preventing the system from being confused.

(First Modification)

Next, a first modification of the system according to the first embodiment will be described.

In the system according to the first modification, the system configuration is the same as that illustrated in FIG. 1 and the configuration of the node 10 is the same as that illustrated in FIG. 2.

The node 10 according to this modification adjusts the size of data to be transmitted based on a transmission data size set by the switch 20.

That is, while the auto-negotiation between the node 10 and switch 20 is being performed on the Ethernet, the switch 20 notifies the node 10 of the transmission data size as a parameter.

Then, the node 10 receives the transmission data size and makes a setting such that it transmits data of an amount corresponding to the received transmission data size.

It follows that all the nodes 10 connected to the switch 20 transmit data of an amount corresponding to the same transmission data size.

Such a configuration eliminates the need to change the transmission data size of the nodes 10 individually but allows the change to be collectively made in the switch 20.

When the auto-negotiation is used in the same manner as in the system according to the modification of the first embodiment, a unique parameter (e.g., transmission data size) of the Ethernet system can be determined/changed not at the node design time but at the installation/setting time.

Second Embodiment

A system according to a second embodiment of the present invention will be described.

The system according to the second embodiment of the present invention is featured in that a use of the auto-negotiation allows even parameters that are not used in Ethernet itself to be determined. Hereinafter, an example of this will be given.

Figure 10:
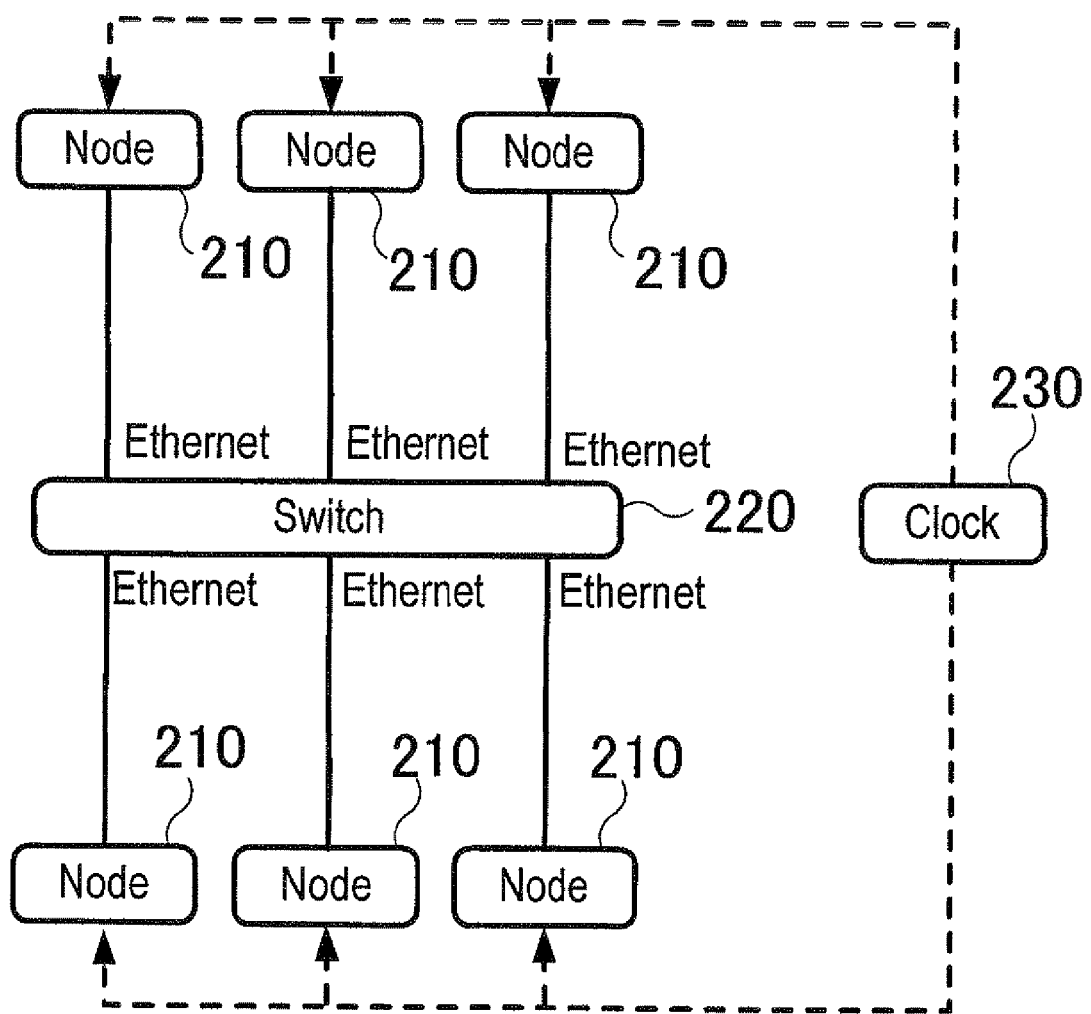
FIG. 10 is a view illustrating a network configuration of a system according to a second embodiment.
Figure 11:
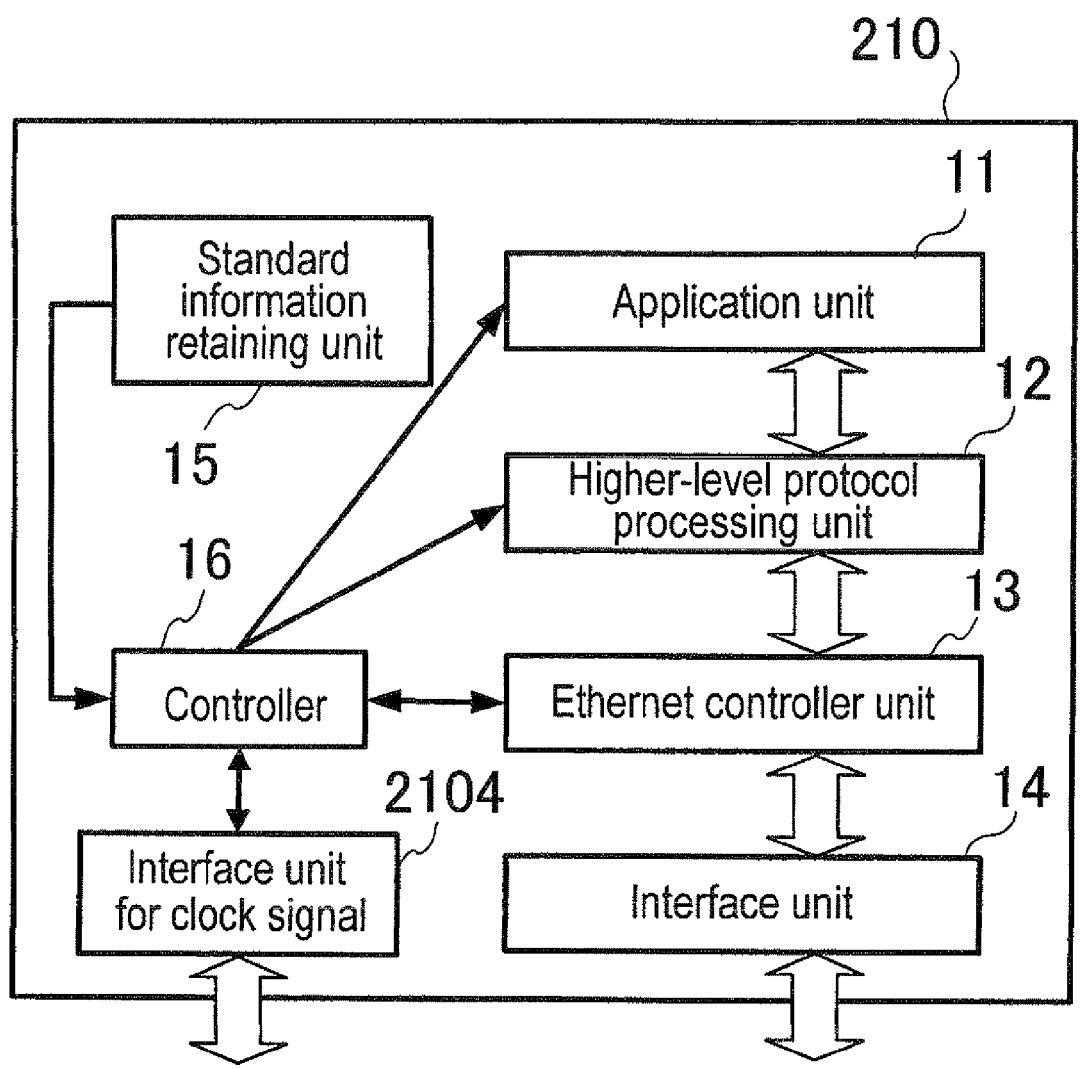
FIG. 11 is a block diagram illustrating a configuration of a node according to the second embodiment.

FIG. 10 illustrates a network configuration of the system according to the second embodiment. FIG. 11 illustrates a configuration of a node 210 according to the second embodiment.

Unlike the node 10 according to the first embodiment, the node 210 has an interface unit for clock signal 2104 that receives an external clock signal. The clock signal is supplied from a clock 230 through a network different from Ethernet.

The interface unit for clock signal 2104 receives the clock signal output from the clock 230 as an external signal. Then, the node 210 operates (e.g., transmits data) in synchronization with the clock signal supplied from the clock 230.

This system does not assume a given specified industrial Ethernet standard and may be applied to any system as long as the nodes constituting the system perform data transmission in synchronization with an external clock.

In this system, some nodes 210 synchronize with the clock signal and some do not.

In the system according to the present embodiment, to prevent the system from being confused when a node that does not synchronize with the clock signal is connected to a switch 220 to thereby be connected to the system, the node 210 notifies the switch 220 as to whether the node 210 has a specification capable of synchronizing with the clock signal in the auto-negotiation. Based on the notification, the switch 220 performs link connection or link disconnection. That is, the switch 220 performs link connection when the node connected thereto can synchronize with the clock signal, while it performs link disconnection of a port connecting to the node 210 when the node connected cannot synchronize.

With the above configuration, it is possible to prevent link connection of the node 210 that does not synchronize with the clock signal to thereby prevent the system from being confused.

(First Modification)

A first modification of the system according to the second embodiment will be described.

In the system according to the first modification of the second embodiment, the system configuration is the same as that illustrated in FIG. 10 and the configuration of the node 210 is the same as that illustrated in FIG. 11.

The node 210 according to the this modification operates according to the number of multiplications of the clock set by the switch 220.

That is, while the auto-negotiation between the node 210 and switch 220 is being performed on the Ethernet, the switch 220 notifies the node 210 of the number of multiplications of the clock as a parameter.

Then, the node 210 receives the number of multiplications of the clock and makes a setting such that it operates according to the received number of multiplications of the clock. The information of the number of multiplications is set in the interface unit for clack signal 2104 by the controller 16.

It follows that all the nodes 210 connected to the switch 220 operate with the same number of multiplications of the clock, i.e., at the same timing. As a result, it is possible to prevent the system from being confused.

According to the system of this modification, the use method of the clock signal which is data supplied from a network different from Ethernet can be adjusted through the auto-negotiation using Ethernet. This means that the auto-negotiation of the above embodiments can perform the configuration of not only the standards to be used in the industrial Ethernet but also other data links (in this example, clock signal line) that each of the nodes uses.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A node including an application execution section and/or an upper layer protocol processing section capable of operating by conforming to one of a plurality of Ethernet standards for industrial applications, the node comprising:
    an Ethernet controller unit that performs auto-negotiation with a switch to exchange, in a Fast Link Pulse (FLP) format, information concerning an interface speed, to determine an interface speed to be used based on the information concerning the interface speed, and to receive, in the FLP format, information including a plurality of setting Ethernet standards;

a storage unit that stores the node's one or more available Ethernet standards, each of which is an Ethernet standard to which the node can conform; and a controller that performs setting of the Ethernet controller unit and setting of the application execution section and/or the upper layer protocol processing section such that the node communicates using an Ethernet standard selected from one or more coincident Ethernet standards between the Ethernet standards to which the node can conform stored in the storage unit and the setting Ethernet standards received by the Ethernet controller unit in the FLP format after the Ethernet controller unit performs the auto-negotiation concerning an interface speed and receives the information including the plurality of setting Ethernet standards, and connects a link to the switch.

2. The node according to claim 1, wherein the storage unit stores a priority order among combinations of the interface speed and node's available Ethernet standards, and the controller selects a standard based on the determined interface speed and the priority order stored in the storage unit.

3. The node according to claim 2, wherein the node receives information including the setting Ethernet standards and transmits information including the node's available Ethernet standards through the auto-negotiation after determining the interface speed to be used, the storage unit defines Ethernet standards that can be selected and cannot be selected depending on the interface speed, and the Ethernet controller unit transmits information that does not include the Ethernet standards that cannot be selected, depending on the determined interface speed, from among the node's available Ethernet standards.

4. The node according to claim 1, further comprising an interface unit that receives a data signal using a network different from a network that the Ethernet controller unit uses, wherein the Ethernet controller unit receives a parameter concerning the data signal from the switch at the time of execution of the auto-negotiation, and when performing the link connection, the node performs an operation based on the data signal and parameter.

5. The node according to claim 1, wherein the controller disconnects a link from the switch in the case where there is no coincident standard between the node's available Ethernet standards and the setting Ethernet standards.

6. A switch capable of conforming to an Ethernet standard and set so as to operate according to a setting Ethernet standard which is selected from a plurality of Ethernet standards for industrial applications, the switch comprising:

an Ethernet controller unit that performs auto-negotiation with a node, which includes an application execution section and/or an upper layer protocol processing section capable of operating by conforming to one of the plurality of Ethernet standards, to exchange, in a Fast Link Pulse (FLP) format, information concerning an interface speed, to determine an interface speed to be used based on the information concerning the interface speed, and to receive, in the FLP format, information including the node's one or more available Ethernet standards, each of which is an Ethernet standard to which the node can conform;

a storage unit that stores setting Ethernet standards; and a controller that performs setting such that the switch communicates using an Ethernet standard selected from one or more coincident standards between the setting Ethernet standards stored in the storage unit and the node's available standards received by the Ethernet controller unit in the FLP format after the Ethernet controller unit performs the auto-negotiation concerning an interface speed and receives the information including the plurality of setting Ethernet standards, and connects a link to the node.

7. The switch according to claim 6, wherein when the Ethernet controller unit performs the auto-negotiation before setting the Ethernet standard to receive information including the node's available standards, the controller sets an Ethernet standard that coincides with one of the node's available Ethernet standards.

8. The switch according to claim 6, wherein in the case where the Ethernet standard for the switch has been set, the Ethernet controller unit transmits information concerning only the set Ethernet standard in the auto-negotiation.

9. The switch according to claim 6, wherein in the case where there is no coincident Ethernet standard between the Ethernet standards stored in the storage unit and node's available standards, the controller disconnects a link from the node.

10. The switch according to claim 6, wherein in the case where the Ethernet standard needs to be changed, the controller disconnects links from all the nodes that have been connected to the switch, and the Ethernet controller unit performs auto-negotiation once again with the nodes that have been disconnected therefrom to transmit information of a new Ethernet standard.

11. A system comprising:

a node including an application execution section and/or an upper layer protocol processing section capable of operating by conforming to one of a plurality of Ethernet standards for industrial applications, and a switch, the node including:

a first Ethernet controller unit that performs auto-negotiation with the switch to exchange, in a Fast Link Pulse (FLP) format, information concerning an interface speed, to determine an interface speed to be used based on the information concerning the interface speed, and to receive, in the FLP format, information including a plurality of setting Ethernet standards;

a first storage unit that stores the node's one or more available Ethernet standards, each of which is an Ethernet standard to which the node can conform; and a first controller that performs setting of the Ethernet controller unit and setting of the application execution section and/or the upper layer protocol processing section such that the node communicates using a standard selected from one or more coincident standards between the Ethernet standards to which the node can conform stored in the first storage unit and the setting Ethernet standards received by the Ethernet controller unit in the FLP format after the Ethernet controller unit performs the auto-negotiation concerning an interface speed and receives the information including the plurality of setting Ethernet standards, and connects a link to the switch, and the switch including:
a second Ethernet controller unit that performs auto-negotiation with the node to exchange, in the FLP format, information concerning an interface speed, to determine the interface speed to be used based on the information concerning the interface speed, and to receive, in the FLP format, the information including the node's available Ethernet standards;
a second storage unit that stores the setting Ethernet standards; and
a second controller that performs setting such that the switch communicates using the selected standard, and connects a link to the node,
when the second Ethernet controller unit performs the auto-negotiation before setting the setting Ethernet standard to receive information including the node's available standard, the second controller sets an Ethernet standard that coincides with one of the node's available Ethernet standards as the setting Ethernet standard.

* * * * *